United States Patent [19]

Strock et al.

[11] Patent Number: 4,758,129
[45] Date of Patent: Jul. 19, 1988

[54] POWER FRAME

[75] Inventors: William J. Strock, Cincinnati; Ambrose A. Hauser, Wyoming, both of Ohio

[73] Assignee: General Electric Company, Cincinnati, Ohio

[21] Appl. No.: 739,804

[22] Filed: May 31, 1985

[51] Int. Cl.[4] .......................... F01D 5/06; F02C 3/04
[52] U.S. Cl. .................................... 415/69; 416/128; 416/157 R; 416/231 B; 60/268
[58] Field of Search .................. 415/65, 66, 68, 69, 415/77, 129, 130, 195; 416/127, 130, 157 R, 158, 128, 231 B; 60/39.162, 268, 226.1, 262

[56] References Cited

U.S. PATENT DOCUMENTS

| | | | |
|---|---|---|---|
| 2,314,572 | 3/1943 | Chitz | 416/130 X |
| 2,941,781 | 6/1960 | Boyum | 415/142 |
| 3,075,743 | 1/1963 | Sheets | 416/231 B X |
| 3,467,198 | 9/1969 | Ellinger | 416/157 X |
| 3,468,473 | 9/1969 | Davies et al. | 416/157 X |
| 3,924,404 | 12/1975 | Pollert | 415/130 X |
| 4,264,274 | 4/1981 | Benedict | 415/199.5 |
| 4,304,522 | 12/1981 | Newland | 415/135 |
| 4,452,566 | 6/1984 | Karoas | 415/115 X |
| 4,478,551 | 10/1984 | Honeycutt, Jr. et al. | 415/142 |
| 4,483,659 | 11/1984 | Armstrong | 416/231 B X |

FOREIGN PATENT DOCUMENTS 2129502  5/1984  United Kingdom ............ 60/268

Primary Examiner—Robert E. Garrett
Assistant Examiner—Joseph M. Pitko
Attorney, Agent, or Firm—Derek P. Lawrence

[57] ABSTRACT

A rotor stage disposed within an annular fluid flowpath in a turbomachine is disclosed. The rotor stage includes outer and inner rings and a plurality of first and second airfoils. The outer and inner rings define flowpath surfaces for said flowpath. The first and second airfoils extend between the rings for transferring energy between the fluid and the rotor stage. At least one of the first airfoils surrounds means for transmitting energy across the flowpath.

12 Claims, 1 Drawing Sheet

POWER FRAME

The invention herein described was made in the performance of work under a NASA contract and is subject to the provisions of Section 305 of the National Aeronautics and Space Act of 1958, Public Law 85-568 (72 Stat. 435; 42 USC 2457).

This invention relates generally to turbomachinery and, more particularly, to a dual function rotor stage therein.

BACKGROUND OF THE INVENTION

Turbomachinery generally includes an annular flowpath for fluid with one or more rotor stages disposed therein. Each rotor stage typically includes a plurality of blades or airfoils for transferring energy between the fluid and the rotor stage.

One form of a turbomachine is a gas turbine engine which generally includes a gas generator comprising a compressor for compressing air flowing through the engine, a combustor in which fuel is mixed with the compressed air and ignited to form a high energy gas stream, and a turbine which includes a rotor for driving the compressor. In gas turbine engines, rotor stages in the compressor transfer energy from the rotor to the air. In the turbine, a rotor stage transfers energy from the gas stream to the rotor. Many engines further include a second turbine, known as a power turbine, located aft of the gas generator which extracts energy from the gas flow to drive a propulsor.

In many applications, it is desirable or necessary to transmit energy between the inner and outer regions defined by the annular flowpath. In other words, it may be necessary to transmit energy across the flowpath.

Transmission of energy across a flowpath typically occurs at non-rotating fixed struts which extend through the flowpath. For example, a power take-off from the main drive shaft of a gas turbine engine may pass through a fixed strut. In some applications, it may be desirable to transmit energy across the flowpath when a fixed strut is not available. For example, in the unducted fan engine such as disclosed in U.S. Patent Application Ser. No. 647,283 U.S. Pat. No. 4,657,484—Wakeman, which includes a counterrotating power turbine with direct drive of counterrotating unducted fan blades, energy must be transmitted across the flowpath in order to change the pitch of the blades.

OBJECTS OF THE INVENTION

It is an object of the present invention to provide a new and improved means of transmitting power across a flowpath.

It is another object of the present invention to provide a dual function rotor stage for a gas turbine engine.

It is yet another object of the present invention to provide a new and improved power frame with increased strength.

It is yet a further object of the present invention to provide new and improved means for varying the pitch of propeller blades.

SUMMARY OF THE INVENTION

The present invention is a rotor stage disposed within a fluid flowpath in a turbomachine. The rotor stage comprises a plurality of first and second airfoils and outer and inner rings. The first and second airfoils extend between the rings and transfer energy between the fluid and the rotor stage. The outer and inner rings define outer and inner flowpath surfaces, respectively. At least one of the first airfoils surrounds means for transmitting energy across the flowpath.

DETAILED DESCRIPTION OF THE INVENTION

The present invention applies generally to any turbomachine. For illustrative purposes, the invention is described as it would be used in a gas turbine engine. One application of the invention, according to a preferred embodiment, is shown in FIG. 1.

Figure 1:
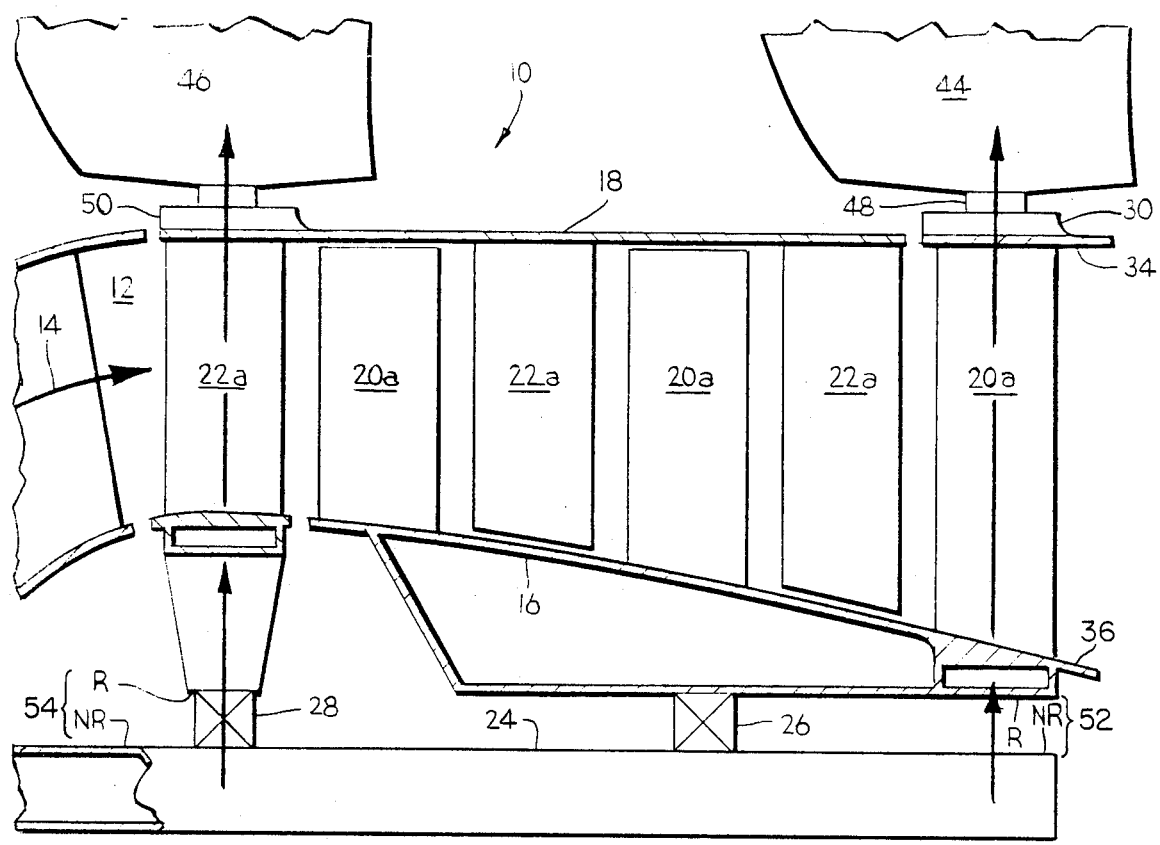
FIG. 1 is a partial longitudinal schematic view which substantially illustrates a preferred embodiment of the present invention.

FIG. 1 discloses a power turbine 10 of a gas turbine engine. Power turbine 10 includes an annular flowpath 12 for a fluid or gas 14. Power turbine 10 includes inner and outer counterrotating rotors 16 and 18, respectively. Inner rotor 16 includes a plurality of inner blade rows or stages 20 which extend radially outwardly therefrom. Each blade row or stage 20 is effective for transferring energy from gas stream 14 to inner rotor 16. Similarly, outer rotor 18 includes a plurality of outer blade rows or stages 22 extending radially inwardly therefrom. Each stage 22 is effective for transferring energy from gas stream 14 to outer rotor 18.

Inner rotor 16 and outer rotor 18 are each supported to a non-rotating shaft 24 by suitable bearing means 26 and 28, respectively. It will be clear that the bearing configuration shown is exemplary only and that numerous alternative configurations are possible and in no way limit the scope of the present invention.

Figure 2:
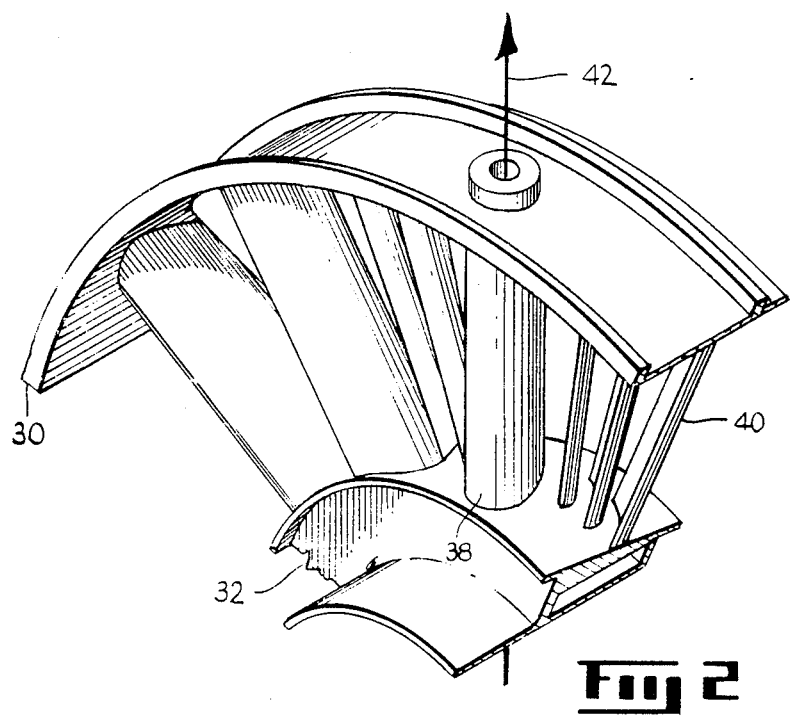
FIG. 2 is a fragmentary perspective view taken generally in the direction of arrow 2 in FIG. 1.

Rotor stage 20a comprises outer ring 30 and inner ring 32 which partially define outer and inner flowpath surfaces 34 and 36, respectively, for flowpath 12. As shown in FIG. 2, rotor stage 20a further comprises a plurality of first airfoils 38 and second airfoils 40 extending between outer ring 30 and inner ring 32. Airfoils 38 and 40 are effective for transferring energy from gas stream 14 into rotor stage 20a. In order to provide improved stiffness characteristics to rotor stage 20a, inner ring 32 is generally box-shaped in radial cross-section.

Each of first airfoils 38 and second airfoils 40 defines an average chord length. The term "chord length" is well-known in the art and is a measure of a distance between the leading and trailing edge of a blade. As shown in FIG. 2, first airfoils 38 have a chord length which is greater than the chord length of second airfoils 40. Generally, the number of first airfoils 38 will be relatively small compared to the number of second airfoils 40. Thus, between any two adjacent first airfoils 38 there will be a plurality of second airfoils 40.

According to another feature of the present invention, at least one of first airfoils 38 encloses transmitting means 42 for transmitting energy across flowpath 12. Transmitting means 42 is shown schematically as an arrow in FIG. 2. According to one embodiment of the present invention, transmitting means 42 may include a conduit for hydraulic fluid. According to another form of the present invention, transmitting means 42 may include a shaft rotatable about its axis. In yet another form of the present invention, transmitting means 42 may include induction means for carrying electricity therethrough. In each embodiment, transmitting means 42 are surrounded by first airfoil 38 and operate independently thereof.

According to the embodiment shown in FIG. 1, power turbine 10 is effective for driving counterrotating propellers 44 and 46. Each propeller 44 and 46 includes pitch changing means 48 and 50, respectively, for varying the pitch of the propeller blades. The energy for actuating the propeller blades will be received by pitch changing means 48 and 50 from transmitting means 42.

In operation, rotor stages 20 and 22 extract energy from gas stream 14. Inner stages 20 drive inner drum rotor 16 which is connected to inner ring 32 of first rotor stage 20a. The energy in inner rotor 16 is thereby transferred to outer ring 30 and then to propeller 44 for providing a propulsive force. Similarly, outer stages 22 drive outer drum rotor 18 which transfers the rotational energy to propeller 46.

Rotor stage 20a is configured so as to increase the energy that rotor stage 20a may extract from gas stream 14. First airfoils 38 must have a relatively large chord length for the strength necessary to carry the rotor load and in order to allow sufficient room for the passage therethrough of transmitting means 42. Second airfoils 40 have a somewhat shorter chord length for reduced weight while maintaining good energy extraction from the fluid.

The energy required to change the pitch of the blades on propeller 44 may be transmitted from non-rotating shaft 24. After passing over the non-rotating/rotating interface 52 (such as through a slip ring or bearing configuration), the energy will be transmitted by way of transmitting means 42 through first airfoil 38 to pitch changing means 48. Pitch changing means 48 may convert this energy to a mechanical torque for varying the pitch of the blades of propeller 44. In a similar manner, energy for changing the pitch of the blades of propeller 46 may pass non-rotating/rotating interface 54 and thence transmitted through a first airfoil 38 on rotor stage 22a.

It will be clear to those skilled in the art that the present invention is not limited to the specific embodiments described and illustrated herein. Nor is the invention limited to rotor stages for turbines. Rather, the invention applies equally to rotor stages for compressors and fans of gas turbine engines. In addition, it applies equally to related structures in any turbomachine.

It will be understood that the dimensions and the proportional and structural relationships shown in the drawings are illustrated by way of example only, and these illustrations are not to be taken as the actual dimensions or proportional structural relationships used in the rotor stage of the present invention.

Numerous modifications, variations, and full and partial equivalents can now be undertaken without departing from the invention as limited only by the spirit and scope of the appended claims.

What is desired to be secured by Letters Patent of the United States is the following.

What is claimed is:

1. In a turbomachine including an annular flowpath for a fluid, a rotor stage disposed within said flowpath comprising:
   outer and inner rings defining outer and inner flowpath surfaces, respectively; and
   a plurality of first and second airfoils extending between said rings for transferring energy between said fluid and said rotor stage;
   wherein at least one of said first airfoils surrounds means for transmitting energy across said flowpath;
   and wherein at least two of said second airfoils are located between adjacent first airfoils.

2. A rotor stage, as recited in claim 1, wherein each of said first and second airfoils define an average first and second chord length, respectively, and wherein said first chord length is greater than said second chord length.

3. A rotor stage, as recited in claim 1, wherein said inner ring is generally box-shaped in radial cross-section.

4. A rotor stage, as recited in claim 1, wherein said rotor stage is disposed within a turbine of said turbomachine.

5. In a counterrotating power turbine of a gas turbine engine including an annular flowpath for receiving a high energy gas stream, an improvement comprising:
   a first rotor stage disposed within said flowpath including:
      outer and inner rings defining outer and inner flowpath surfaces, respectively; and
      a plurality of first and second airfoils for extracting energy from said gas stream, at least two of said second airfoils being located between adjacent first airfoils; and
      first transmitting means for transmitting energy across said flowpath, wherein at least one of said first airfoils surrounds said first transmitting means.

6. An improvement, as recited in claim 5, wherein each of said first and second airfoils defines an average first and second chord length, respectively, and wherein said first chord length is greater than said second chord length.

7. An improvement, as recited in claim 5, wherein said inner ring is generally box-shaped in radial cross-section.

8. An improvement, as recited in claim 5, further comprising:
   an inner rotor including a plurality of inner blade rows extending radially outwardly therefrom for transferring energy from said gas stream to said inner rotor;
   wherein said inner ring of said power turbine is connected to said inner rotor so that energy is transferred from said inner rotor to said outer ring.

9. An improvement, as recited in claim 8, further comprising:
   first and second counterrotating propellers wherein said first propeller is driven by said inner rotor.

10. An improvement, as recited in claim 9, wherein said first propeller has a plurality of variable pitch first propeller blades and wherein said first transmitting means is effective for varying the pitch of said first propeller blades.

11. An improvement, as recited in claim 10, further comprising:
   a second rotor stage disposed within said flowpath including:
      outer and inner rings defining outer and inner flowpath surfaces, respectively; and
      a plurality of first and second airfoils extending between said outer and inner rings for extracting energy from said gas stream, at least two of said second airfoils being located between adjacent first airfoils;
second transmitting means for transmitting energy across said flowpath, wherein at least one of said first airfoils of said rotor stage surrounds said second transmitting means; and
an outer rotor including a plurality of outer blade rows extending radially inwardly therefrom for transferring energy from said gas stream to said outer rotor;
wherein said second propeller has a plurality of variable pitch second propeller blades and wherein said second transmission means is effective for varying the pitch of said second propeller blades.

12. In a turbine of a gas turbine engine including an annular flowpath for a fluid, a rotor stage disposed within said flowpath comprising:
outer and inner rings defining outer and inner flowpath surfaces, respectively; and
a plurality of first and second airfoils extending between said rings and rigidly connected thereto for transferring energy from said fluid to said rotor stage;
wherein at least one of said first airfoils surrounds means for transmitting energy across said flowpath,
and wherein at least two of said second airfoils are located between adjacent first airfoils.

* * * * *